(12) United States Patent
El-Damhougy et al.

(10) Patent No.: US 7,881,217 B2
(45) Date of Patent: Feb. 1, 2011

(54) REMOTE GATEWAY SELECTION IN AN INTERPLANETARY COMMUNICATIONS NETWORK AND METHOD OF SELECTING AND HANDING OVER REMOTE GATEWAYS

(75) Inventors: Hesham El-Damhougy, Tustin, CA (US); Keith Jarett, Lafayette, CA (US)

(73) Assignee: The Boeing Company, Chicago, IL (US)

( * ) Notice: Subject to any disclaimer, the term of this patent is extended or adjusted under 35 U.S.C. 154(b) by 913 days.

(21) Appl. No.: 11/749,179

(22) Filed: May 16, 2007

(65) Prior Publication Data

US 2008/0151913 A1    Jun. 26, 2008

Related U.S. Application Data

(63) Continuation-in-part of application No. 11/613,839, filed on Dec. 20, 2006.

(51) Int. Cl.
    *H04W 24/00* (2009.01)
(52) U.S. Cl. ..................................... 370/252
(58) Field of Classification Search ............ 370/252
    See application file for complete search history.

(56) References Cited

U.S. PATENT DOCUMENTS 7,599,314 B2 * 10/2009 Wittenschlaeger .......... 370/254

OTHER PUBLICATIONS

Ian F. Akyildiz et al., "TCP-Planet: A Reliable Transport Protocol for InterPlaNetary Internet"; IEEE Journal on Selected Areas in Communications, vol. 22, No. 2, Feb. 2004.

Loren P. Clare et al., "Space-based Multi-hop Networking"; Computer Networks 47 (2005) 701-724.

Michael D. Noakes et al., "An Adaptive Link Assignment Algorithm for Dynamically Changing Topologies"; IEEE Transaction on Communications, vol. 41, No. 5, May 1993.

Chien-Chung Shen et al., "A flexible routing architecture for ad hoc space networks"; Computer Networks, vol. 46, No. 3, Oct. 2004.

Chien-Chung Shen et al., "Interrogation-Based Relay Routing for Ad Hoc Satellite Networks"; IEEE Globecom, Taipei, Taiwan, Nov. 17-21, 2002.

Ian F. Akyildiz et al. "InterPlaNetary Internet: State-of-the-Art and Research Challenges"; Computer Networks 43 (2003) 75-112.

* cited by examiner

*Primary Examiner*—Melvin Marcelo
(74) *Attorney, Agent, or Firm*—Law Office of Charles W. Peterson, Jr.

(57) ABSTRACT

A method of selecting a gateway node in a remote network and for handing over to the selected gateway node. Nodes in a remote energy aware network connect through a gateway node to a backbone network in an interplanetary communications network. Each node optimizes a stability function describing communications to neighboring nodes and to the backbone. Optimization is for maximum network stability and for efficient node energy consumption. Optimization identifies a handover time and nodes initiate handover sufficiently in advance of the identified handover time to complete at that time. Nodes continually monitor and update network characterization parameters to identify a next optimal handover time.

24 Claims, 9 Drawing Sheets

BASE STATIONS

FIG. 6B

REMOTE GATEWAY SELECTION IN AN INTERPLANETARY COMMUNICATIONS NETWORK AND METHOD OF SELECTING AND HANDING OVER REMOTE GATEWAYS

CROSS REFERENCE TO RELATED APPLICATION

The disclosure is a continuation in part of U.S. patent application Ser. No. 11/613,839, filed Dec. 20, 2006, now U.S. Pat. No. 7,764,622, "INTERPLANETARY COMMUNICATIONS NETWORK, INTERPLANETARY COMMUNICATIONS NETWORK BACKBONE AND METHOD OF MANAGING INTERPLANETARY COMMUNICATIONS NETWORK," to Hesham El-Damhougy et al., and related to U.S. Pat. No. 7,542,436, "TACTICAL COGNITIVE-BASED SIMULATION METHODS AND SYSTEMS FOR COMMUNICATION FAILURE MANAGEMENT IN AD-HOC WIRELESS NETWORKS," to Hesham El-Damhougy, filed Jul. 22, 2005; and to U.S. Pat. No. 7,742,425, "NEURAL NETWORK-BASED MOBILITY MANAGEMENT FOR MOBILE AD HOC RADIO NETWORKS," U.S. Pat. No. 7,555,468, "NEURAL NETWORK-BASED NODE MOBILITY AND NETWORK CONNECTIVTY PREDECTIONS FOR MOBILE AD HOC RADIO NETWORK," U.S. Pat. No. 7,693,120, "NEURAL NETWORK-BASED MOBILITY MANAGEMENT FOR SELF-PARTITION DETECTION AND IDENTIFICATION OF MOBILE AD HOC RADIO NETWORKS," and U.S. patent application Ser. No. 11/426,428, "NEURAL NETWORK-BASED MOBILITY MANAGEMENT FOR HEALING MOBILE AD HOC RADIO NETWORKS," to Hesham El-Damhougy, all four filed Jun. 26, 2006; and to U.S. patent application Ser. No. 11/749,172, "METHOD OF OPTIMIZING AN INTERPLANETARY COMMUNICATIONS NETWORK," to Hesham El-Damhougy et al., filed coincident herewith, all assigned to the assignee of the present application and incorporated herein by reference.

BACKGROUND

1. Technical Field

The embodiments of the disclosure generally relate to ad-hoc communications networks and, more particularly, to an ad-hoc interplanetary communications network for adaptable deep-space communications in an unstructured and self-supervised interplanetary or sub-planetary environment, such as between deep-space or lunar probes and earth.

2. Background Description

The National Air and Space Administration (NASA) is planning for future outer space exploration and, especially, for deep space interplanetary exploration in our solar system and beyond. Current plans allow for a yet-to-be-designed and developed interplanetary communications network to provide communication services between space borne entities (including deep space entities) and the earth. Primarily, the interplanetary communications network is expected to provide communication services for scientific data delivery and also provide navigation services for exploration spacecraft and orbiters in future deep space missions. The current vision for the infrastructure of this interplanetary communications network is similar to the Internet. See, e.g., Akyildiz et al., "InterPlaNetary Internet: state-of-the-art and research challenges," *Computer Networks*, 43 (2003). This as yet unrealized interplanetary communications network infrastructure or, Interplanetary Internet, is enabling networking technology for future deep space scientific exploration missions such as Mars and Neptune exploration and beyond.

Generally, an interplanetary communications network is expected to include communication between nodes at various space borne entities or locations, e.g., at fixed (celestially fixed) and/or mobile communications platforms. Individual nodes may include, for example, fixed (on a planet surface) sensors, and mobile nodes, e.g., robotics as well as human operated nodes. The nodes are expected to be distributed at numerous space borne locations and deep space entities. These entities may include, for example, robotic spacecraft and Crew Exploration Vehicles (CEV's); planetary platforms, e.g., orbital, local flight and surface planet (mobile and fixed) vehicles; and, sub-planetary probes, e.g., on moons, satellites, and asteroids.

Neither terrestrial Internet-based routing nor terrestrial mobile ad hoc routing protocols satisfy space communications parameter requirements because of additional constraints and requirements for space communications, such as burst data transfers between nodes in a short transfer window. A typical Earth-based wireless network includes fixed communications backbone nodes (e.g., base stations) that define cells, for example, connected together in the network. An earth network that lacks the fixed communications backbone nodes is known as an ad-hoc network. Instead, a group of autonomous (and frequently mobile) nodes define the ad-hoc Earth network. However, since there is no fixed frame of reference in space, node locations are in constant motion with respect to one another even at rest.

Consequently, backbone network structure is expected to be fluid and continually, dynamically changing, whether as a result of planetary rotation or orbital movement. Dynamically changing node locations cause connectivity among the network nodes to vary with time. Further, connectivity may change because of other interference, such as blockage of the line-of-sight communications path by a planet or from extra-network interference, e.g., sunspot activity. This continual connectivity change makes network infrastructure time varying also and difficult to pre-define, especially as the total number of nodes gets large. Thus, the interplanetary communications network is expected to be an ad-hoc network, primarily of autonomous nodes self-managing and self-maintaining connectivity in spite of the fluidity of the network communication paths.

These autonomous nodes must assure some form of network connectivity to maintain end-to-end communications for mission success. This is especially important for exchanging large volumes of data that may be collected by various space borne network platforms. Therefore, the network nodes themselves must automatically self-configure/self-provision nodes/platforms along network paths to deliver the expected volume of data. Furthermore, this must be with minimal or no manual intervention/interference, as none may be available. Given that even when a communications window is available between two nodes, there may still be a relatively long transmission path lag time or propagation delay, even between two relatively close communicating nodes, e.g., on the moon and on the Earth. Therefore, Akyildiz et al. describe several significant challenges and issues that must be addressed and resolved before interplanetary communications network objectives may be realized.

Specifically, backbone layer routing is a serious problem area with key previously unresolved challenges. Traditional Shortest Path Algorithms (SPA) include, for example, the Bellman-Ford algorithm and Dijkstra's algorithm. The Bellman-Ford algorithm has been realized by the known Internet Border Gateway Protocol (BGP). Dijkstra's algorithm has been realized by the Internet Open Shortest Path First (OSPF) protocol for Autonomous Systems (AS). The interplanetary communications network will not have a traditional end-to-end path because of long periods (minutes, hours or even days) of no connectivity between nodes and groups of nodes. End-to-end connectivity is not guaranteed and, if it occurs, it may be only sporadic. Therefore, traditional end-to-end routing approaches are unsuitable for interplanetary communications network routing. Moreover, because of nodal motion, it may be difficult to identify an end-to-end path because performance/routing metrics (e.g., propagation and connectivity metrics) are time-dependent. Consequently, optimal or suboptimal routes are time-dependent. This time-dependence makes both the Bellman-Ford algorithm and Dijkstra's algorithm inadequate.

With current technology achieving significant distances in space, such as interplanetary space travel, currently take years to reach their objectives. Thus, distant nodes are likely to be the oldest and have the oldest equipment. Consequently, for example, because storage density increases with each new generation, storage is likely to be denser and more plentiful at nodes closer to Earth and scarcer at distant nodes. Thus, storage capacity may be in short supply and, therefore, very costly at these distant nodes as well as other intervening nodes in the network paths. As a result, long term storage requirements for storing data when a connection is unavailable can cause storage contention and overflow at those distant or intervening nodes, e.g., from data arriving simultaneously from several distant nodes. Therefore, locating and planning an optimal route requires complete knowledge and consideration of network path resources as well as key time-dependent network parameters, e.g., contact times and orbital parameters, and traffic loads and node queuing delays.

Furthermore, an interplanetary communications network is likely to be an amalgamation of sub-networks that are based on different distinct network protocols, e.g. layer-3 routing protocols. These distinct network protocols must communicate with the network through strategically located gateways. However, maintaining an even data traffic flow between network nodes that are based on different distinct network protocols requires that network gateways seamlessly convert between network protocols. Since the nodes are mobile, the gateway node positions are predictable, e.g., satellites orbiting about a distant planet.

However, connections to these mobile nodes are also normally time varying. As a result, node responsibilities change from time to time, with different nodes being designated as gateway as node connections change. So, at some point in time a node may have the best position to act as gateway and assume that responsibility. Subsequently, that node may move from that location (as other nodes also move out of position) with another node having the best location and assuming gateway responsibility. While it may be relatively simple to decide at any instant which node is at the best location to act as gateway; the continual variation in node locations further complicates gateway selection and timing and managing each gateway handover from one network node to another.

Moreover, since very likely remote planetary surface nodes, for example, must be self powering, it is likely that those remote nodes self power with solar chargeable batteries. However, even a fully charged solar battery has a limited (fixed) power capability before it must be recharged. If mid-transmission, a currently selected gateway expends all of its available power (i.e., discharges its battery), the remote network is cut off from the backbone until it selects another gateway and resumes communications. While data may or may not be lost, the cutoff degrades network performance and impairs network stability.

Accordingly, there is a need for a self organizing interplanetary communications network for communicating between earth and exploration and data collecting probes, both manned and unmanned and, more particularly, for transporting collected mission critical data with minimum delay and data loss.

SUMMARY

An advantageous embodiment includes a method of selecting a gateway node in a remote network and for handing over to the selected gateway node. Nodes in a remote energy aware network connect through a gateway node, e.g., a planetary satellite, to a gateway node in a backbone network that is in an interplanetary communications network. Each node optimizes a stability function describing communications to neighboring nodes and to the backbone. Optimization is for maximum network stability and for efficient node energy consumption. Optimization identifies a handover time and nodes initiate handover sufficiently in advance of the identified handover time to complete at that time. Nodes continually monitor and update network characterization parameters to identify a next optimal handover time.

Advantageously, each remote network/sub-network node selects a gateway and determines an optimum hand over time for a stable energy aware network topology. Selection occurs with minimal inter-node communications for minimal maintenance overhead and computational. Further, planetary surface networks may make energy aware gateway selections to jointly maximize gateway contact times and minimize transmission power consumption, preferably unimpeded by payload energy constraints. Gateways are selected to manage energy consumption to efficiently use available power, thereby prolonging gateway node link life, and strategically selecting optimal recharge times. Gateways are further selected to maximize useful network lifetime, as well as maximize traffic delivered to destinations in a current window. The selection optimizes network stability by minimizing the number of gateway selection/handovers between remote nodes and potential gateways with selection being distributed amongst remote nodes and executed asynchronously.

BRIEF DESCRIPTION OF THE DRAWINGS

The foregoing and other objects, aspects and advantages will be better understood from the following detailed description of a preferred embodiment of the disclosure with reference to the drawings, in which.

DETAILED DESCRIPTION

Figure 1A:
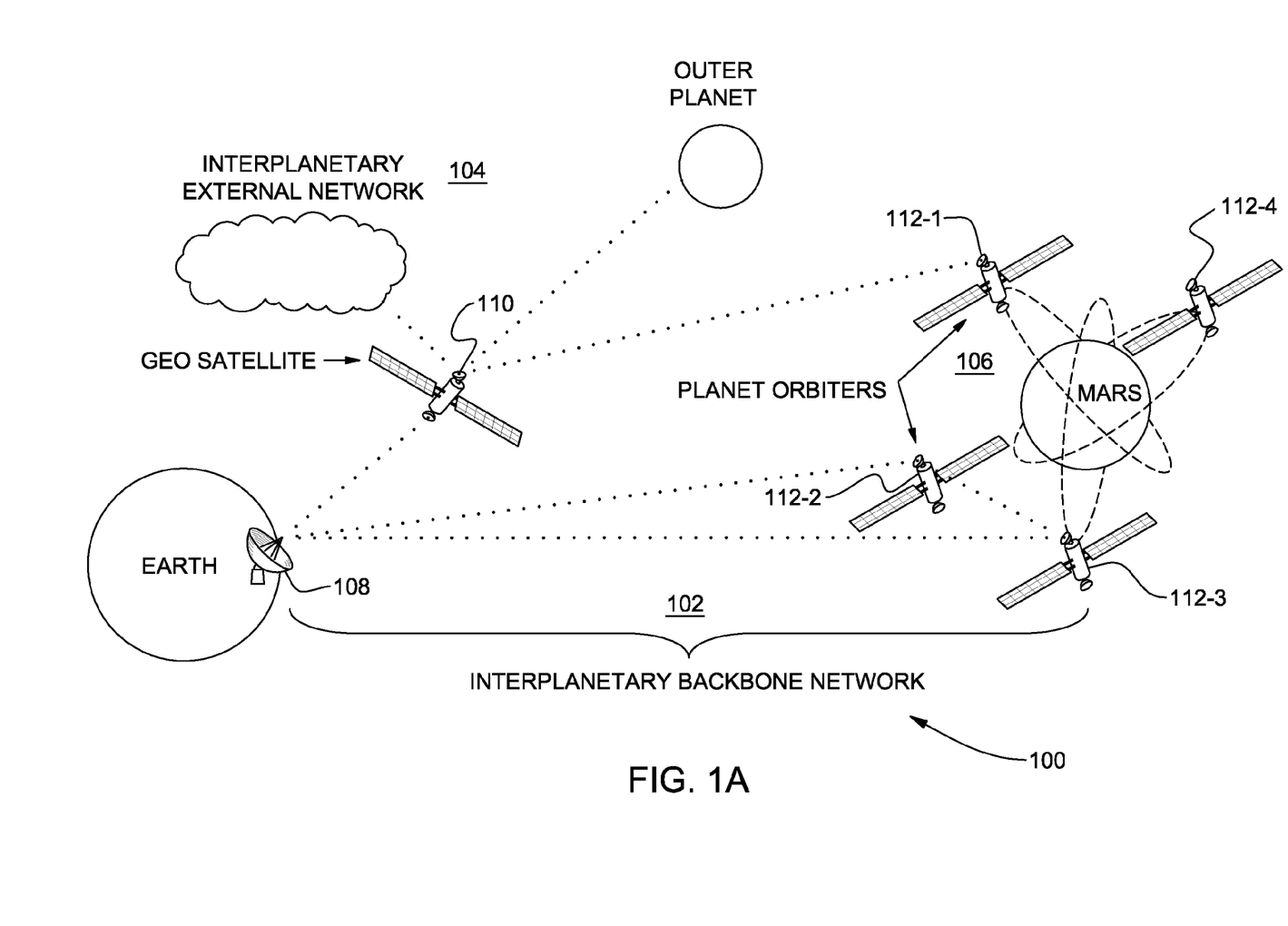
FIGS. 1A-B illustrate an example of a preferred hierarchical interplanetary communications network or Interplanetary Internet, referred to herein as an Interplanetary Communications Neural Network (ICNN).
Figure 1B:
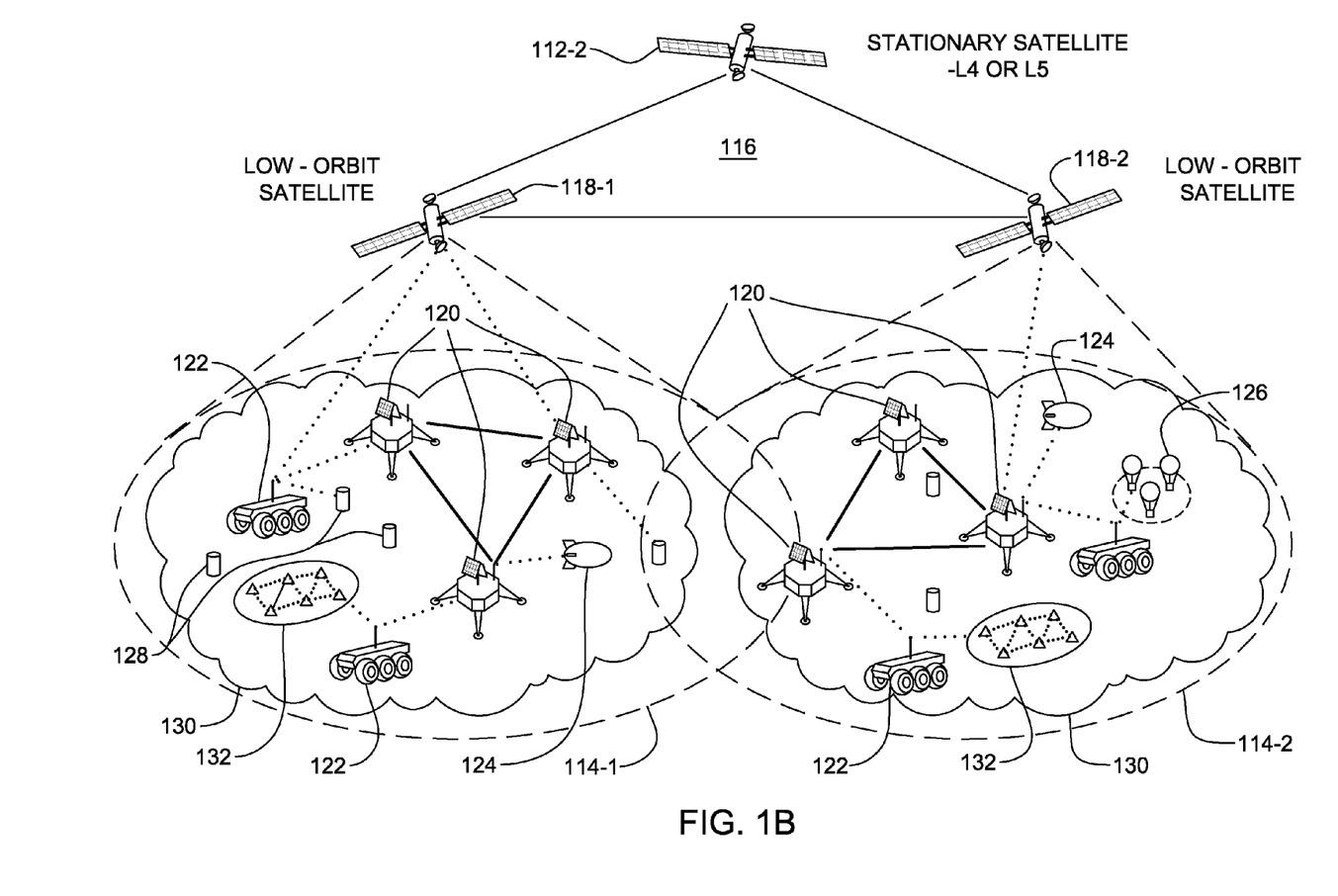

Turning now to the drawings, FIGS. 1A-B illustrate an example of a preferred hierarchical interplanetary communications network 100 or Interplanetary Internet, referred to herein as an Interplanetary Communications Neural Network (ICNN). Preferably, ICNN nodes are hierarchically organized with: a primary system or sub-network (interplanetary backbone network 102); an autonomous intermediate system or sub-network (interplanetary external network 104 with nodes having predictable trajectories); and, one or more tertiary systems or sub-networks (e.g., planetary network(s) 106). The autonomous intermediate sub-network 104 and tertiary sub-networks 106 may periodically attach to the interplanetary backbone network 102. At one end communications originate/terminate at one or more fixed earth stations 108. The intermediate nodes in the interplanetary external network 104 include, for example, a geostationary (GEO) satellite 110 relaying communications to ICNN endpoints. A typical planetary network 106 is energy aware and includes multiple planet stationary satellites 112-1, 112-2, 112-3, 112-4 (equivalent to geostationary or other high-orbit relay satellite).

According to an advantageous embodiment network nodes maintain network communications by automatically and dynamically self-selects a gateway node to interface and communicate between otherwise distinct network partitions. These distinct network partitions may be real partitions where, absent the gateway node, one part of the network is isolated from the other. However, the distinct network partitions may be virtual partitions where the two sections of the network are based on two incompatible network protocols with the gateway node providing compatibility. So, for example, the planetary network 106 automatically and dynamically self-selects a gateway node to the interplanetary backbone network 102. In another example, the planetary network 106 automatically and dynamically self-selects a gateway node to planetary surface base stations.

Preferably, the ICNN 100 is a self-monitoring ad-hoc network with an Artificial Neural Network (ANN) in each node in an Adaptive Self Organizing Neural Network (ASONN). Further, each ANN node adapts and learns from surrounding (dynamically) environmental conditions, and may be in hardware or software. There are several different types of ANN nodes that may be suitable as ICNN nodes for different types of applications within the network 100. These types include feed-forward ANN nodes that learn with a teacher, recurrent ANN nodes that learn with or without a teacher and self organizing ANN nodes that learn without a teacher. Most frequently, ANNs are implemented in feed-forward nodes that are trained using what is normally referred to as a Back Propagation (BP) Algorithm. In general, however, an ANN is relatively robust, simple to train, and self-repairing.

The ICNN nodes may be space borne, airborne and ground based communications units or stations. With ICNN nodes selected and located as described herein, the preferred hierarchical interplanetary communications network 100 includes an optimized number of nodes, at optimized node capacities and with node placement based on predicted and measured communications termination points, communications loads and path parameters. Once selected and in place, the ICNN nodes are trained off-line for static routing and network planning.

In addition, preferably based on the universal approximation property of multi-layer perceptron (MLP) neural networks, an ANN can do almost anything a computer does without a priori knowledge of all possible outcomes required in a fixed computer program. Thus, ANNs may have application to any computable or recursive function. Such functions are objective functions that may include, but are not limited to, for example: tasks that involve prediction/forecasting (e.g., financial forecasting and highway safety tasks); adaptive filtering and system identification tasks (e.g., adaptive equalizers and for speech/image recognition); data mining tasks (e.g., data clustering and fault/failure diagnosis); and, combinatorial optimization tasks (both linear and non-linear). Thus, a preferred interplanetary communications network 100 is a hierarchical network of ANN nodes (or ICNN nodes) trained to use many of these ANN functions. Preferably, the ANN nodes are trained substantially as described in U.S. Pat. No. 7,542,436, "TACTICAL COGNITIVE-BASED SIMULATION METHODS AND SYSTEMS FOR COMMUNICATION FAILURE MANAGEMENT IN AD-HOC WIRELESS NETWORKS," filed Jul. 22, 2005, assigned to the assignee of the disclosure and incorporated herein by reference.

The backbone network 102 includes a relatively small number of predictably moving nodes (tens of nodes or even less), automatically and dynamically routing communications between endpoints, e.g., originating/terminating between a fixed earth station 108 and remote nodes in the planetary networks 106. Communications between distant nodes 112-1, 112-2, 112-3, 112-4 on planets (e.g., Mars) or non-planets (e.g., Pluto) may be characterized by large propagation delays, i.e., tens of seconds to tens of minutes or more. When connected and/or linked, backbone nodes form a communication backbone that may be treated, more or less, as connected by dedicated point-to-point links. An example of managing backbone communications is described in U.S. Pat. No. 7,764,622, "INTERPLANETARY COMMUNICATIONS NETWORK, INTERPLANETARY COMMUNICATIONS NETWORK BACKBONE AND METHOD OF MANAGING INTERPLANETARY COMMUNICATIONS NETWORK," to Hesham El-Damhougy et al. (hereinafter "Backbone"), filed Dec. 20, 2006, assigned to the assignee of the present invetnion and incorporated herein by reference.

Preferably, the interplanetary external network 104 provides shorter-range links (than direct links) through nodes 110 that have predictable trajectories with a time varying attachment to the interplanetary backbone network 102. So, communications routes may be direct between two connected nodes; or, indirect, passing through intermediate nodes, e.g., passing through GEO satellite 110 in the interplanetary external network 104. These nodes 110 in the interplanetary external network 104 may be, for example and without limitation, groups of spacecraft in deep space, spacecraft between planets, sensor node clusters, and groups of space stations.

FIG. 1B shows an example in more detail of a tertiary planetary network 106 which typically includes tens (10s) or hundreds (100s) of relatively small and lightweight nodes. So, each tertiary planetary network 106 is energy aware and may include one or more planetary surface networks 114-1, 114-2 and planetary satellite network 116, primarily, of solar-based energy renewable nodes. The planetary satellite network 116 in this example, includes a planet stationary satellite 112-2 (equivalent to geostationary or other high-orbit relay satellite including 112-1, 112-3, 112-4 in FIG. 1A) and low orbit satellites 118-1, 118-2, analogous to low Earth orbit satellites. As used herein, a remote node is a node that is not a backbone node in backbone network 102, but is a termination point on the backbone network 102. More particularly, a remote node may be a GEO satellite (e.g., 110, 112-1, 112-2, 112-3 and 112-4), a low orbit satellite (equivalent to a Low Earth Orbit or LEO satellite, e.g., 118-1, 118-2) or a planetary fixed node, on or in close vicinity of a planet.

Each network or sub-network 102, 104, 106, 114-1, 114-2, 116 may operate based on a protocol that is different than others and may use different routing algorithms. So, for example, the planetary satellite network 116 may be based on an high level protocol, while planetary surface networks 114-1, 114-2 may incorporate suitable land mobile wireless ad-hoc routing protocols, modified for energy awareness. Moreover, each sub-network 102, 104, 106, 114-1, 114-2, 116 may interface with others through a self-designated gateway node (e.g., a planet stationary satellite 112-1, 112-2, 112-3, 112-4 or a surface node with a direct link to a destination node) in the particular network or sub-network. A self-designated gateway planet stationary satellite 112-2 may be considered part of the interplanetary backbone network 102 for interplanetary communications.

Nodes in the planetary surface networks 114-1, 114-2 may be embodied in any suitable land based or low altitude wireless communications capable vehicle. So, for example and without limitation, each of the planetary surface networks 114-1, 114-2 may include suitable numbers of lander vehicles 120 providing a local network backbone; terrain based craft or rovers 122; flying nodes such as aircraft 124 (e.g., a piloted and/or drone aircraft) and balloons 126; fixed/deployed probes 128 and/or sensors 128, e.g., an array 130 of sensors 132.

In terrestrial-style networks such as planetary surface networks 114-1, 114-2, network latency from propagation delays may be very low and, therefore, might be ignored. Nodes 120-130 in these planetary surface networks 114-1, 114-2 may move erratically and suffer contention from sharing RF channels. Even with high levels of communications overhead, however, there may be hundreds to thousands of nodes 120-130 that provide plentiful capacity for maintaining network connectivity in the planetary surface networks 114-1, 114-2. Accordingly, planetary surface network connectivity may be changing continually due to erratic local node movement. Communications connectivity may be treated within planetary surface networks 114-1, 114-2 as equivalent to a suitable earth-based ad-hoc network. Such a suitable Earth-based ad-hoc network is described in U.S. Pat. No. 7,742,425, "NEURAL NETWORK-BASED MOBILITY MANAGEMENT FOR MOBILE AD HOC RADIO NETWORKS," U.S. Pat. No. 7,555,468, "NEURAL NETWORK-BASED NODE MOBILITY AND NETWORK CONNECTIVITY PREDICTIONS FOR MOBILE AD HOC RADIO NETWORK," U.S. Pat. No. 7,693,120, "NEURAL NETWORK-BASED MOBILITY MANAGEMENT FOR SELF-PARTITION DETECTION AND IDENTIFICATION OF MOBILE AD HOC RADIO NETWORKS," and U.S. patent application Ser. No. 11/426,428, entitled "NEURAL NETWORK-BASED MOBILITY MANAGEMENT FOR HEALING MOBILE AD HOC RADIO NETWORKS," all four filed Jun. 26, 2006, assigned to the assignee of the present application and incorporated herein by reference.

The planet stationary satellites 112-1, 112-2, 112-3, 112-4 may be located at Lagrangian points ($L_4$ or $L_5$) in the interplanetary backbone network 102. However, due to relative movement, e.g., orbital motion, links to some nodes 110, 112-1, 112-2, 112-3, 112-4 are continually changing with most links occurring only at intermittent windows. Preferably, the network is designed to minimize constraints to communications external to the backbone 102. Further, communications is optimized in spite of intermittent availability from limited and/or intermittent connectivity, that in more extreme cases may severely limit communications with remote nodes. So by analyzing network performance to identify specific needs, e.g., identifying node and/or link bottlenecks, ANN nodes may be selected as described in U.S. patent Ser. No. 11/749,172, "METHOD OF OPTIMIZING AN INTERPLANETARY COMMUNICATIONS NETWORK," to Hesham El-Damhougy et al., filed coincident herewith, assigned to the assignee of the present application and incorporated herein by reference.

Figure 2A:
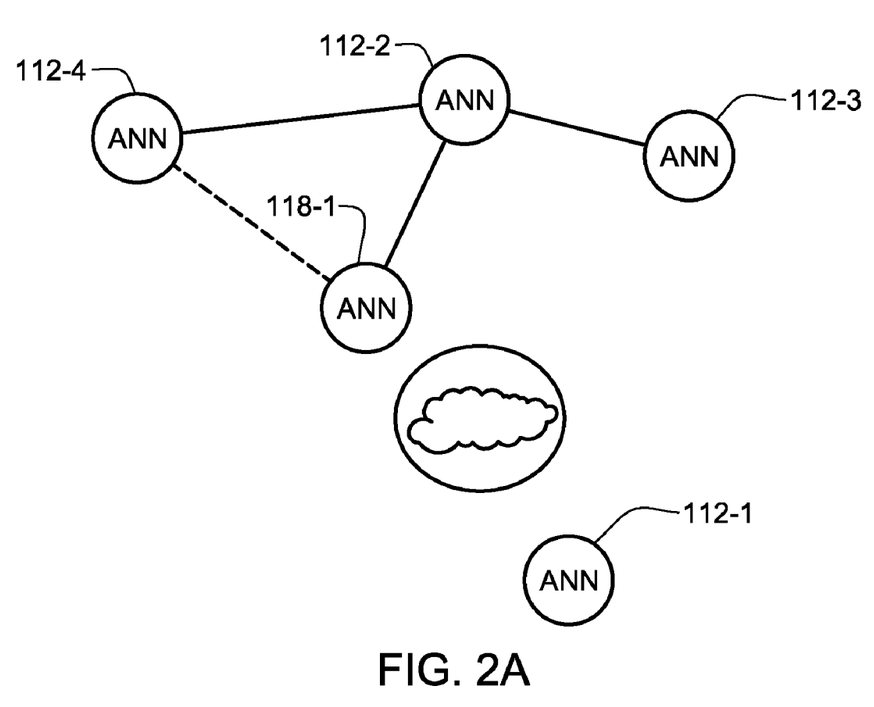
FIG. 2A shows a graphical representation of a cross section of the ICNN representing communications between a remote node, e.g., LEO satellite, and the backbone, e.g., through planet stationary satellites.

FIG. 2A shows a graphical representation of a cross section of the ICNN representing communications between a remote node, e.g., LEO satellite 118-1, and the backbone 102, e.g., through planet stationary satellites 112-1, 112-2, 112-3, 112-4. Nodes (118-1) within a particular sub-network (tertiary planetary network 106) self-select a gateway node, e.g., 112-2, for interplanetary/extra-planetary communications through the backbone network 102. Generally, gateway selection is for optimum stability, simplicity and network reliability. Since network connectivity is continually changing with each node 112-1, 112-2, 112-3, 112-4, 118-1 having time varying and, very likely, periodic connection to other nodes, connection to a selected gateway node is also varying and, very likely, periodic.

Figure 2B:
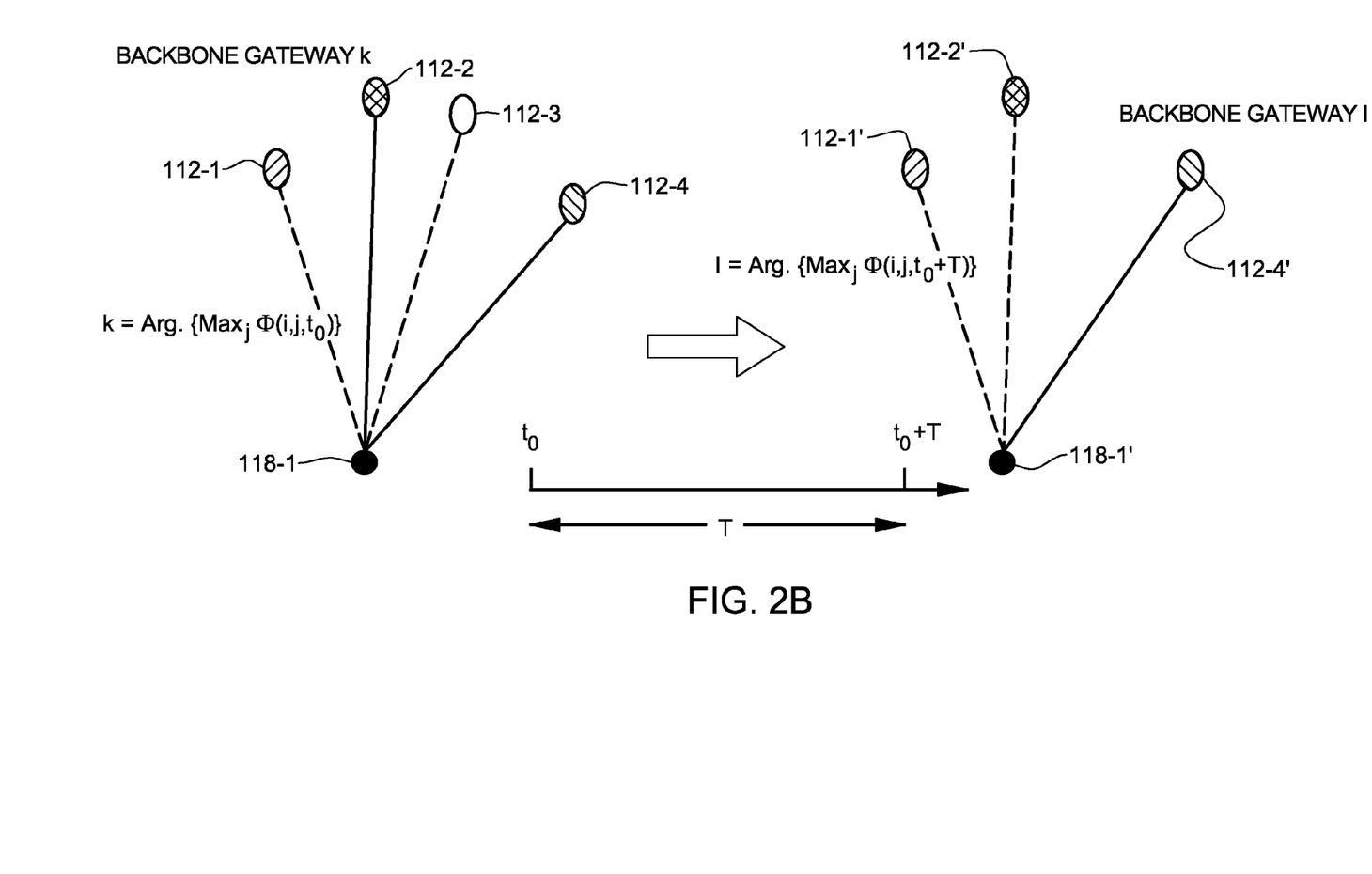
FIG. 2B represents selecting a new gateway node and handover to the selected gateway node.

FIG. 2B represents selecting a new gateway node and handover to the selected gateway node according to an advantageous embodiment. Initially in this example at some time $t_0$, remote node 118-1 (e.g., a surface base station node) is connected to node 112-2 and approaching a window to node 112-4. After some period of time, the nodes 112-1', 112-2', 112-3', 112-4', 118-1' have relocated and the contact window from remote node 118-1' to current gateway node 112-2' ends. The contact window may end, for example, from node movement or from the gateway node 118-1' exhausting its power reserves. At the same time that nodes (e.g., 118-1') are losing contact to the current gateway 112-2', those nodes may have a window open to another node, e.g., 112-4'. Unless node 118-1' makes prior provision for selecting another gateway 112-4', at time $t_0+T$, before losing contact with the first gateway 112-2', node 118-1' will lose contact to the network for some resulting period of time, at least until it selects another gateway or gateways and reestablishes communications.

Rather than allow the window to the current gateway node 112-2' to end, it is beneficial for each node i to identify another node j for as a gateway at some prior time. The nodes 112-1', 112-2', 112-3', 112-4', 118-1' select the next gateway node from a number of neighboring nodes and transfer gateway responsibility or handover to the selected node j. Selection is according to an objective function $\Phi(i,j,t)$, that characterizes a pre-specified performance measurement for each node. Gateway selection may be optimized in each node i by optimizing this objective function $\Phi(i,j,t)$. More particularly, Gateway Selection @ time $t \Leftrightarrow \text{Max}_j\{\Phi(i,j,t)/j \in \text{Set of neighboring gateways to node i}\}$.

Gateway handover timing is described herein for optimum stability with minimum handover frequency and maximum connectivity time. Gateway stability, quantified as a stability metric (SM), depends upon a number of link parameters that describe both the connection time and quality of transmission from node i to gateway node k. As noted herein above, each window has a binary time varying value that may be periodic or cyclical. Window size, $w_{ik}(t)$, is the size of a contact window between node i and node k. Link life, $T_{ik}(t)$, is the remaining time that node i is connected to node k. Waiting time, $\tau_{ik}(t)$, is the remaining time to the start of the next window from the remote node i to the backbone node k. The Euclidean distance between the two nodes is $D_{ik}(t)$. Because reception power typically falls off with respect to distance from the transmission (power) source and, more particularly, for a point source proportional to the square of the distance, quality of the connection between two nodes is related to the node transmit power, $p_{ik}(t)$, and inversely related to the Euclidean distance (to some power or exponent $\gamma$) between the two. Free space propagation has a constant exponent $\gamma=2$ and, $p_{ik}(t) \alpha D^{\gamma}_{ik}(t)$.

The parameters may be combined into a gateway selection objective function $\Phi(i,j,t)$ as $\Phi=F_{ik}(t)=F_{ik}(D_{ik}(t), T_{ik}(t), \tau_{ik}(t), p_{ik}(t); w_{ik}(t))$, for selecting a particular neighboring node as a gateway. More particularly, for a given set of tuned system coefficients, $C_i$ (i=1, 2, 3, 4, 5), the gateway stability selection function, $F_{ik}(t)$, may be expressed as, $$F_{ik}(t) = \frac{C_1}{D(t)^{\gamma}_{ik}} + C_2 T_{ik}(t) + \frac{C_3}{\tau_{ik}(t)+1} + C_4 w_{ik}.$$

Preferably, the system coefficients, $C_i$, are tuned for the best overall system performance and to ensure that the gateway stability selection function, $F_{ik}(t)$, is continuous over the compact interval of the entire system period or optimization horizon. Generally, these system parameters are indexed by both the remote node i and the backbone node k.

Figure 3:
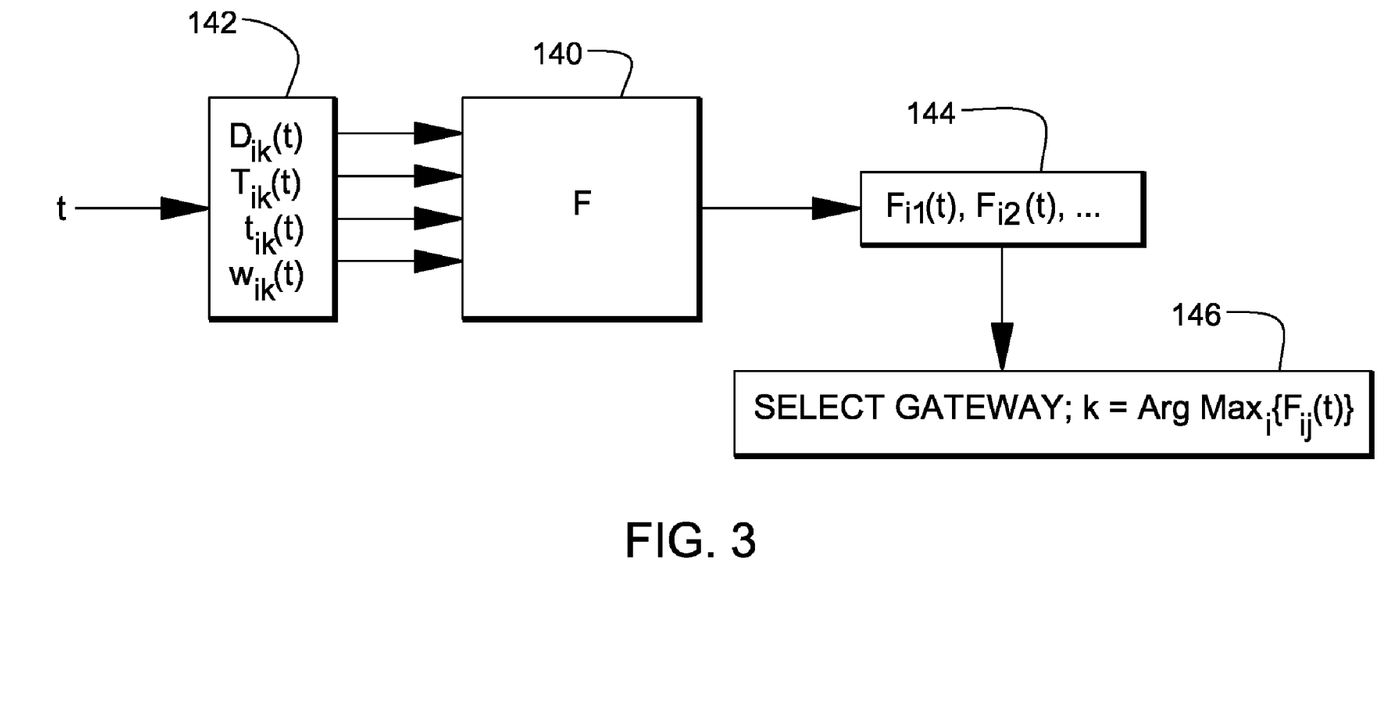
FIG. 3 shows an example of training a remote node, both off-line and on-line, for gateway selection.

FIG. 3 shows an example of training a remote node 140, both off-line and on-line, for gateway selection based on system parameters 142 according to a preferred embodiment of the present disclosure. The remote node 140 generates a gateway stability selection function 144, $F_{ij}(t)$ or stability metric (SM), to each neighboring node j=1, 2, . . . . The backbone node k with the highest gateway stability selection function, $F_{ik}(t)$, is designated as the primary gateway. Nodes that have the second and third highest values become assistant (secondary) gateways, e.g., as a backup. If, for example, the primary gateway fails a secondary gateway can assume primary gateway responsibility. Each remote node i selects 146 a gateway node k by optimizing $F_{ij}(t)$ with respect to the index i and time t. In particular, the node i that has a window with maximal length time interval $[t_{i0}, t_{ij}]$ to the backbone has the highest gateway stability selection function, $F_{ij}(t)$. More particularly, $F_{ij}(t)=\text{Max}_k F_{ik}(t)$; $\forall t \in [t_{i0}, t_{ij}]$, i.e., $F_{ik}(t) \leq F_{ij}(t)$ $\forall k$, $t \in [t_{i0}, t_{ij}]$.

Whenever a stability metric is available for all nodes, each node has a locally available cost for all links (i.e., to neighboring nodes) and optimization is substantially similar to distance vector routing. In this case, each node on the route follows the same procedure to compute the next hop to a gateway. Preferably, each node caches results until the next stability metric update. Caching results as next hops are computed minimizes computation costs.

Each remote node monitors gateway stability and, preferably, before a currently selected gateway becomes obsolete or unavailable, the remote node determines a successor gateway. With any remote node initiating a handover from a current gateway node to a second node, some system dependent time period (a system parameter) is required to complete a handover at handover time ($T_h$); where a system period for the remote node begins with the handover to the current gateway node and ends at time $T_h$ (seconds, minutes, etc.), some determined time after the initial handover. During this system period, the stability metric functions ($F_{ik}(t)$) are continuous. Further, for any remote node a handover from one gateway node to a second takes a selected time (T*) to accomplish with minimum processing, communications or system interruption. Thus preferably, at least T* (seconds, minutes, etc.) before a handover scheduled at $T_h$, the remote node gives the current gateway advance notice that a changeover/handover to another gateway is pending. After $T_h$ the current gateway is no longer qualified to serve as gateway until notified otherwise.

Figure 4:
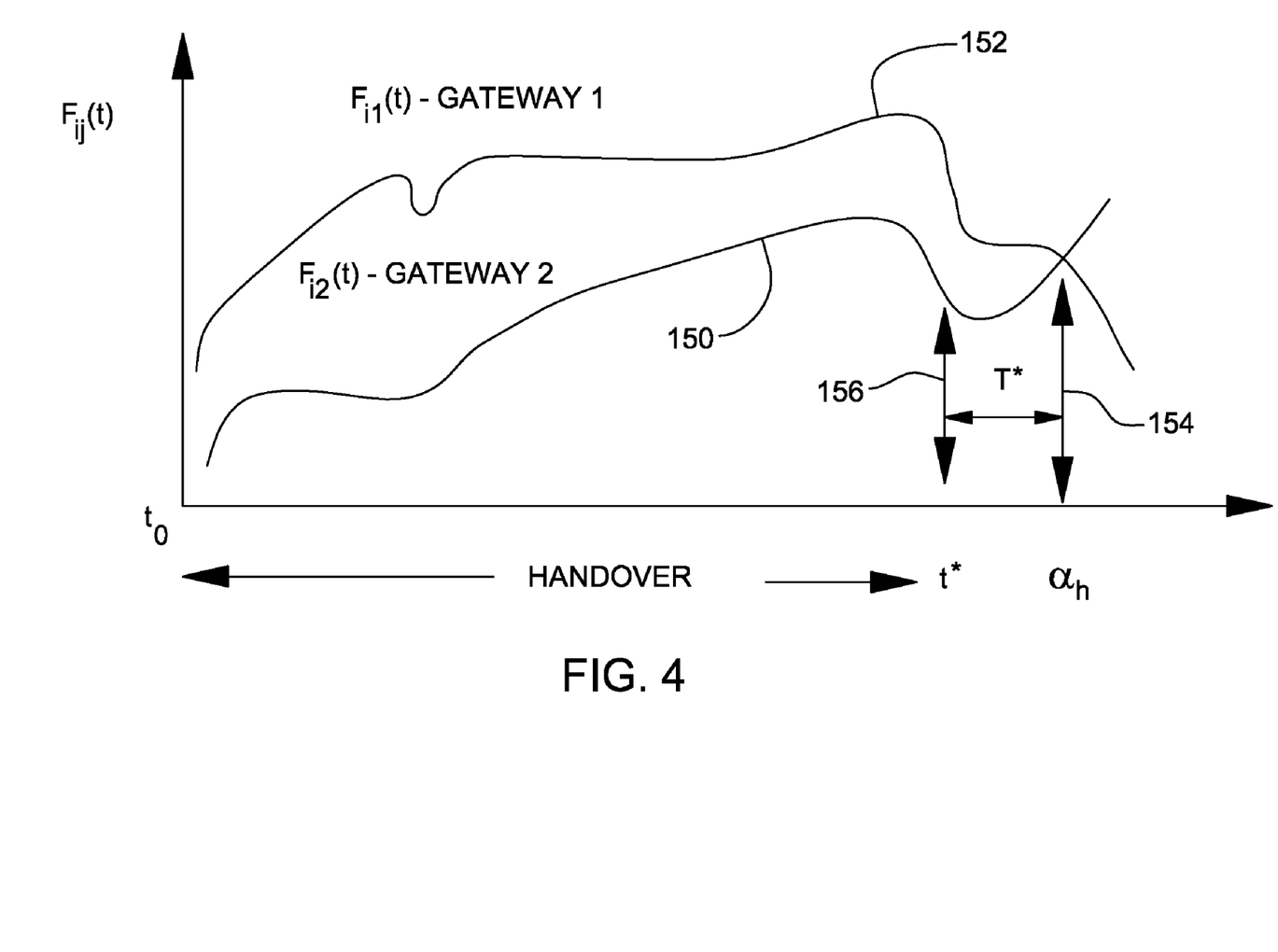
FIG. 4 shows an example a graphical comparison for stability metrics for two neighboring nodes from a remote node.

FIG. 4 shows an example of a graphical comparison for stability metrics 150, 152 for two neighboring nodes 1, 2, to remote node i. The stability metrics have respective root times, $\alpha_1$ and $\alpha_2$, that converge at $\alpha_h$ at 154, i.e., $\alpha_h$ is selected as $T_h$. Initially at time $t_0$ node 1 has the highest instantaneous value and so, begins as the gateway node. Typically, the root times are random times. The random variation in root times depend upon orbital perturbations and measurement errors. The handover begins at 156, time t*, i.e., T* before handover 154. The stability metrics match at $\alpha_h$ at handover 154 and the handover from node 1 to node 2 is complete. So, generally, a current gateway node k for remote node i hands over to some other node m, when $F_{ik}(t) \leq F_{im}(t)$; and according to the intermediate value theorem, $\{F_{ik}(t)-F_{im}(t)\}=0$ for some handover time, $T_h$. Therefore, optimal handovers to neighboring nodes occur at root times $\alpha_1 \leq \alpha_2 \leq \ldots, \leq \alpha_n$ of $\{F_{ik}(t)-F_{im}(t)\}$, $k \neq j$. Thus, handovers to gateway m1 or m2 can begin at time t*, where t*=$\alpha_{m1}$-T* and $F_{im}(\alpha_{m1})=\text{Max}_{k \neq j}\{F_{im}(\alpha_{m1})\}$; or, where t*=$\alpha_{m2}$-T* and $\alpha_{m2}=\text{Min}_j\{\alpha_j\}$.

Figure 5:
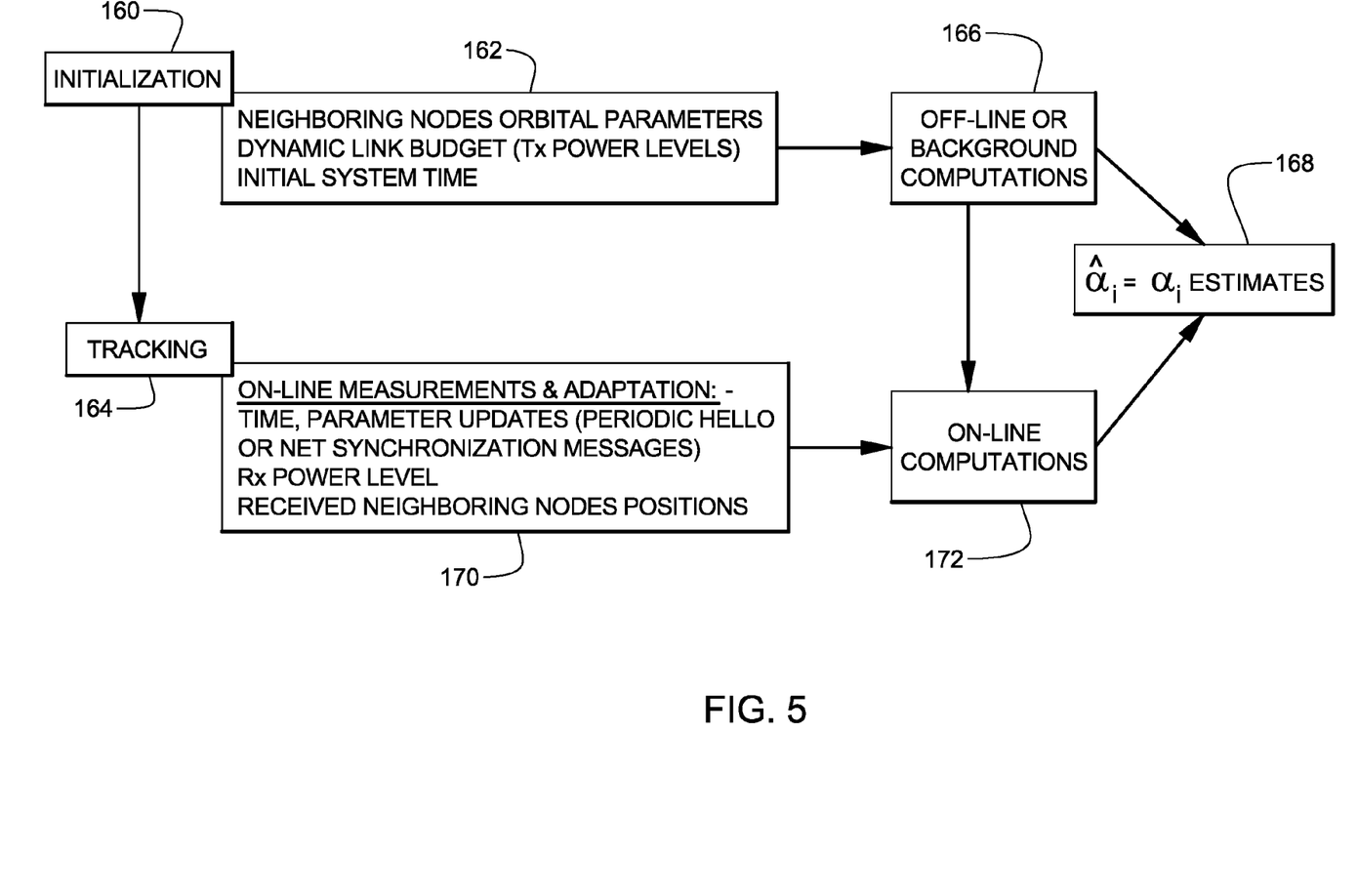
FIG. 5 shows an example of a framework for offline and on line training of remote nodes for gateway handover.

FIG. 5 shows an example of a framework for off line and on line training remote nodes for gateway handover according to a preferred embodiment of the disclosure. After node initialization 160, remote node characteristics 162 are generated and nodes begin tracking 164 themselves and each other. The remote node characteristics 162 may include, for example, neighboring nodes orbital parameters, dynamic link budget (e.g., transmission (Tx) power levels) and an initial system time. Initially, the remote node characteristics 162 are provided for off-line or background analysis 166. Off-line analysis 166 generates initial estimates of root times 168, to identify an initial gateway and an optimum handover time. After the initial estimates, tracking results are provided for on-line measurement and adaptation 170. On line measurement and adaptation 170 includes periodic parameter updates, e.g., based on "Hello" or synchronization messages, node reception (Rx) power levels and connected neighboring node positions. The on line measurement and adaptation 170 is passed to on-line analysis 172 to update estimated root times 168 from initial off-line analysis 166 and, thereafter, from previously cached on-line analysis 170.

Since remote nodes are not easily refueled, typical remote nodes are self-powered and derive power locally, e.g., from solar rechargeable batteries. How long a particular node i may remain active depends both upon the energy ($E_i$) that the node battery can store and the rate of power consumption while the node is active. An inefficient node may expend more energy and, therefore, consume more transmission power, than a more efficient node. Moreover, each node may require time to recharge its battery(ies). Recharging may require down time or, at least, diminish node capacity. How long recharging takes also depends upon local ambient conditions (i.e., planetary weather conditions, whether the sky is overcast or clear), location in the solar system and global conditions (e.g., time of day) as well.

Therefore, managing energy consumption to prolong node link life or, at least, to efficiently use available power, and strategically select optimal recharge times, is essential. So, in consonance with managing gateway handovers for optimum stability the network, sub-networks and nodes must be energy aware. Preferably, handovers are selected to maximize useful network lifetime, as well as maximize traffic delivered to destinations in a current window.

Figure 6A:
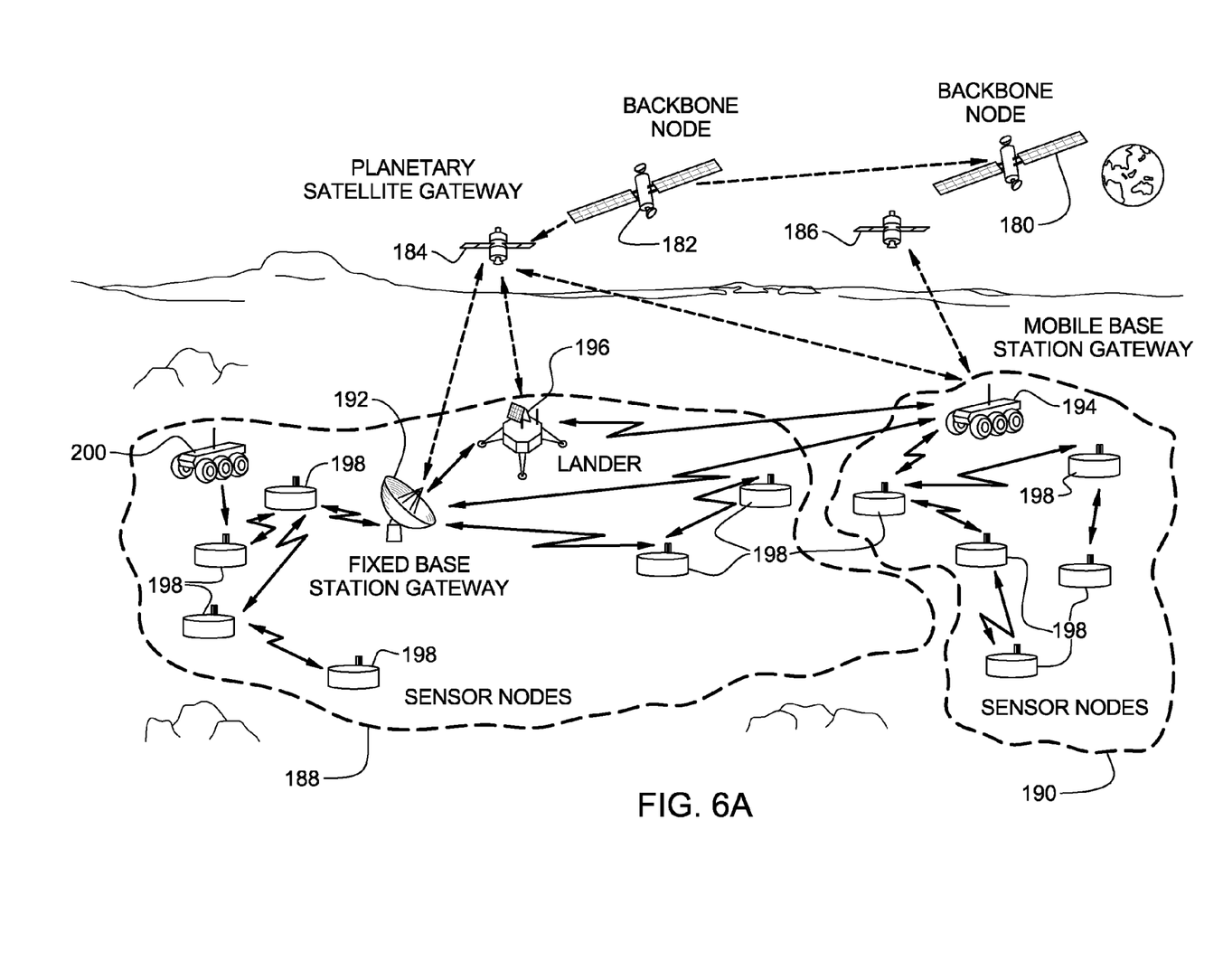
FIG. 6A shows an energy aware cross section example of preferred planetary architecture, wherein backbone nodes link the energy aware planetary surface network to earth, e.g., through planetary satellites.

FIG. 6A shows an energy aware cross sectional example of preferred planetary architecture, wherein backbone nodes 180, 182 link the energy aware planetary surface network to earth, e.g., through planetary satellites 184, 186. The planetary satellites 184, 186 can act as gateway nodes to the backbone nodes 180, 182. Preferably, the planetary surface network includes energy aware ad hoc networks 188, 190, two in this example, with nodes 192, 194, 196, 198, 200 that are addressable using a standard protocol, e.g., Internet Protocol (IP) based addressing. The energy aware ad hoc networks 188, 190 can include surface or airborne nodes (e.g., a fixed base station 192 and a mobile base station 194) that may have windows to the backbone nodes 180, 182 and so, also may act as gateway nodes. Each base station ($B_i$) 192, 194 has an initial (at the start of each transmission window) stored energy, $E_i$, and preferably, controls transmission power, adjusting power as needed in a particular transmission interval for a particular distant (to the gateway) node, e.g., planetary satellites 184, 186 or backbone nodes 180, 182.

The energy aware ad hoc networks 188, 190 of this example also include distributed data collection nodes such as landers 196, surface sensor nodes 198 performing basic sensing applications and rovers 200. Typically, the base station nodes 192, 194 have windows to the planetary satellites 184, 186. So, even when surface nodes are not acting as gateways to the backbone, at least one base station node 192, 194, may be acting as a gateway to the planetary satellites 184, 186, at least one of which, may in turn be acting as a gateway node to the backbone. Also, all surface nodes 192, 194, 196, 198, 200 may be capable of communicating directly with planetary satellites 184, 186. These surface networks 188, 190 are energy aware and so, manage communications to maximize network uptime or link life (e.g., for efficient use of fixed base station 192 solar battery power), as well as maximize traffic delivered to destinations in a current window.

Preferably, base station nodes 192, 194 are capable of serving as surface gateways and are stationary or at least low mobility nodes. Typical such surface base stations have limited processing capability and local storage, e.g., on the order of several megabytes. Also, typical base station nodes 192, 194 have an ad hoc communication protocol capability suitable for communicating with other local (to the base station) nodes including landers 196, remote sensors 198 and rovers 200. Thus, the energy aware ad hoc networks 188, 190 and the base stations 192, 194 in the networks 188, 190 handover to, for example, gateway planetary satellites 184, 186, for efficient use of battery reserves. In particular, handovers are selected to maximize base station battery lifetime, while satisfying network traffic demands and maximizing network connectivity.

As noted hereinabove, each subnetwork 188, 190 typically may include tens (10s) or hundreds (100s) of these relatively small and lightweight sensor nodes 198. The sensor nodes 198 periodically collect sensed data and wirelessly transmit the collected data to a local base station 192, 194. Thus, remotes sensors 198 may be suited primarily for data gathering and relaying the gathered data to a surface gateway (base stations). So, remote sensors 198 may have no or substantially less storage capability than, for example, the base stations. Typically, the base station nodes 192, 194 collect data from the sensor nodes 198 and cache the collected data until a window occurs. The base station nodes 192, 194 also select one or more node(s) as a gateway and forward cached data through the selected gateway(s), e.g., to earth. Similarly, the base station nodes 192, 194 may cache incoming data, e.g., designated for multiple surface nodes and/or for surface nodes that are not currently in communications with the base station. At some suitable time the cached data may be distributed to the respective surface nodes, e.g., either timer based on in response to remote commands from an Earth based control center.

Figure 6B:
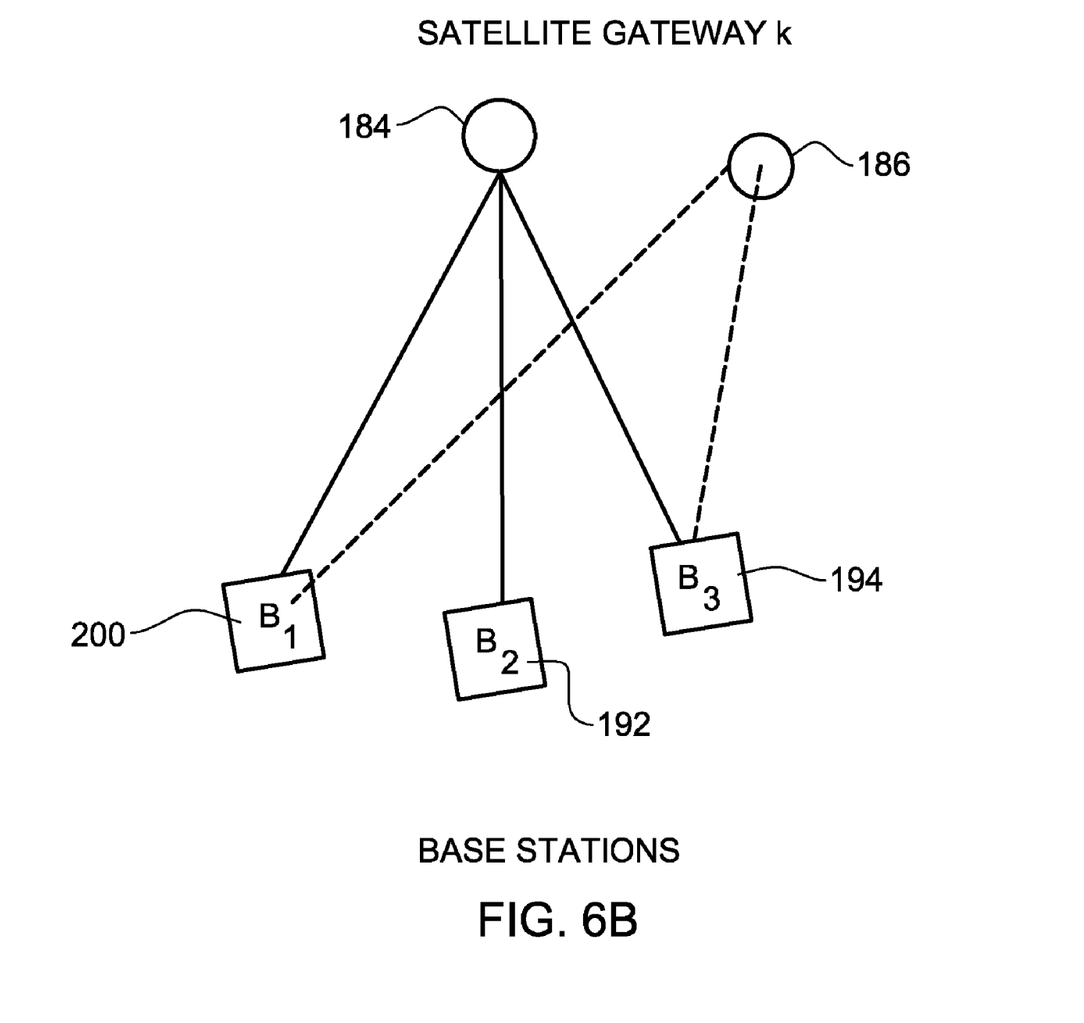
FIG. 6B shows a graphical example of base station to planetary gateway selection.

FIG. 6B shows a graphical example of the network of FIG. 6A for base station to planetary gateway selection with like nodes labeled identically. In a preferred energy aware ad hoc network with M base station nodes (3 in this example) and N satellite nodes (2 in this example), each base station node i has a set of $n_{ik}$ sub-contact windows $\{c_{ik}^{l_{ik}}:l_{ik}=1,\ldots,n_{ik}\}$ to each neighboring satellite k. Links ($l_{ik}$) in these sub-contact windows may be treated as being short enough that the required base station transmit power $p_{ik}^{l_{ik}}$ is constant during any one window, i.e., during each window the distance between the base station node i and neighboring satellite k is essentially constant and the base station has sufficient stored energy. Optimization may be constrained by the connected satellite links during partial sub-windows ($s_{ik}^{l_{ik}}$), i.e., whether base stations communicate with only one satellite or with multiple satellites.

Where base stations are constrained to communicate with only one satellite k at a time gateway selection is optimized according to:

$$\text{Maximize}_{\{s_k^{l_i}\}} \sum_{k,l_{ik}} c_{ik}^{l_{ik}} s_k^{l_{ik}};$$

Subject to $\sum_k s_k^{l_{ik}} \geq 1 \; \forall \; l_i = 1,2,\ldots,n_i$, i.e., the base station has access to at most one satellite during the link, $l$;

$$\sum_{k,l_i} c_{ik}^{l_{ik}} p_{ik}^{l_{ik}} s_k^{l_{ik}} \leq E_i; \text{(the}$$

base station energy constraint);

With $s_i^{l_{ik}} \in \{1, 0\}; i = 1,2,\ldots,N.$

Where base stations i can communicate with multiple gateway satellites at a time, network communications are optimized according to:

$$\text{Maximize}_{\{s_k^{l_i}\}} \sum_{k,l_{ik}} c_{ik}^{l_{ik}} s_k^{l_{ik}};$$

Subject to $\sum_k s_k^{l_{ik}} \geq 1 \; \forall \; l_i = 1,2,\ldots,n_i;$ $$\sum_{k,l_i} c_{ik}^{l_{ik}} p_{ik}^{l_{ik}} s_k^{l_{ik}} \leq E_i;$$

With $s_i^{l_{ik}} \in \{1, 0\}; i = 1,2,\ldots,N.$

From this data capacity availability/requirements may be determined from $$M_i - \sum_{k,l_{ik}} r_k p_{ik}^{l_{ik}} s_k^{l_{ik}},$$

where $r_k$ is the base station to satellite link speed and $M_i$ is the projected traffic volume (including protocol overhead) during recharge.

Advantageously, each remote network/sub-network node selects a gateway and determines an optimum hand over time for a stable energy aware network topology. Selection occurs with minimal inter-node communications for minimal maintenance overhead and computational. Further, energy aware selection jointly maximizes gateway contact times and minimizes transmission power consumption, preferably unimpeded by payload energy constraints. Gateways are selected to manage energy consumption to efficiently use available power, thereby prolonging gateway node link life, and strategically selecting optimal recharge times. Gateways are further selected to maximize useful network lifetime, as well as maximize traffic delivered to destinations in a current window. The selection optimizes network stability by minimizing the number of gateway selection/handovers between remote nodes and potential gateways with selection being distributed amongst remote nodes and executed asynchronously.

While the embodiments of the disclosure have has been described in terms of preferred embodiments, those skilled in the art will recognize that the embodiments can be practiced with modification within the spirit and scope of the appended claims. It is intended that all such variations and modifications fall within the scope of the appended claims. Examples and drawings are, accordingly, to be regarded as illustrative rather than restrictive.

We claim:

1. A method of selecting remote gateway nodes in an interplanetary communications network, said method comprising the steps of:
   a) connecting nodes in a remote network to a backbone network in an interplanetary communications network, connected said nodes connecting through a gateway node;
   b) determining an objective function for each node in said remote network, said objective function characterizing communications over said interplanetary communications network through a plurality of gateway candidate nodes in said remote network;
   c) selecting a handover gateway from said gateway candidate nodes and identifying a handover time for said handover gateway, having an optimum said objective function result; and
   d) initiating a handover to said handover gateway, said handover being initiated a selected time prior to said handover time.

2. A method of selecting remote gateway nodes as in claim 1, wherein each of said nodes determines said objective function from orbital parameters for neighboring nodes and a dynamic link budget for said neighboring nodes.

3. A method of selecting remote gateway nodes as in claim 1, wherein after each said handover is complete, said method comprises returning to step (b), updating objective functions and selecting a next said handover gateway.

4. A method of selecting remote gateway nodes as in claim 3, wherein each of said node measures objective function parameters prior to returning to step (b), an updated said objective function being determined from measured said objective function parameters.

5. A method of selecting remote gateway nodes as in claim 4, wherein said objective function parameters between each node i and a backbone node k comprise: link life ($T_{ik}(t)$), Euclidean distance ($D_{ik}(t)$), transmit power ($p_{ik}(t)$), waiting time ($\tau_{ik}(t)$), contact window size ($w_{ik}(t)$), and said objective function ($F_{ik}(t)$) has the form, $F_{ik}(t)=F_{ik}(D_{ik}(t), T_{ik}(t), \tau_{ik}(t), p_{ik}(t); w_{ik}(t))$.

6. A method of selecting remote gateway nodes as in claim 5, wherein $p_{ik}(t) \alpha D^{\gamma}_{ik}(t)$ with $\gamma=2$ for free space propagation.

7. A method of selecting remote gateway nodes as in claim 5, wherein said objective function further has the form, $$F_{ik}(t) = \frac{C_1}{D(t)_{ik}^{\gamma}} + C_2 T_{ik}(t) + \frac{C_3}{\tau_{ik}(t)+1} + C_4 w_{ik}$$

for selected tuned parameter coefficients, $C_i$ (i=1, 2, 3, 4, 5).

8. A method of selecting remote gateway nodes as in claim 5, wherein said objective function ($F_{ik}(t)$) between each node i and a backbone node k is optimized with respect to index k and time t, during a maximal time interval $[t_{i0}, t_{ik}]$, where $F_{ik}(t)=\text{Max}_k F_{ik}(t); \forall t \in [t_{i0}, t_{ik}]$.

9. A method of selecting remote gateway nodes as in claim 8 wherein the maximal time interval $[t_{i0}, t_{ik}]$, is identified by determining t from $F_{ik}(t) \leq F_{ij}(t)) \forall k$, where $t \in [t_{i0}, t_{ik}]$.

10. A method of selecting remote gateway nodes as in claim 5, wherein said objective function ($F_{ik}(t)$) between each node i and a backbone node k is optimized with respect to index k and time t, such that during interval $[t_{i0}, t_{ik}]$, where $$F_{ik}(t) \leq F_{ij}(t) \forall k, t \in [t_{i0}, t_{ik}].$$

11. A method of selecting remote gateway nodes as in claim 5, wherein handovers from current node k to said handover gateway m occur at roots of $\{F_{ik}(t)-F_{im}(t)\}$, such that $F_{ik}(t) \leq F_{im}(t)$.

12. A method of selecting remote gateway nodes as in claim 4, wherein said remote network includes M base station nodes and N satellite handover candidate nodes, each base station node has battery energy ($E_1$), a set of $n_{ik}$ sub-contact windows $\{c_{ik}^{I_{ik}}:I_{ik}=1, \ldots, n_{ik}\}$ to each neighboring satellite, and for each link ($l_{ik}$) with a constant power transmission capability of $p_{ik}^{I_{ik}}$, and gateway selection is optimized for communicating with a single linked satellite k during partial sub-windows ($s_{ik}^{I_{ik}}$) according to $$\text{Maximize}_{\{s_k^{l_i}\}} \sum_{k,l_{ik}} c_{ik}^{l_{ik}} s_k^{l_{ik}};$$

$$\text{Subject to } \sum_k s_k^{l_{ik}} = 1 \ \forall \, l_i = 1,2,\ldots,n_i;$$

$$\sum_{k,l_i} c_{ik}^{l_{ik}} p_{ik}^{l_{ik}} s_k^{l_{ik}} \leq E_i;$$

$$\text{With } \quad s_i^{l_{ik}} \in \{1, 0\}; i = 1,2, \ldots, N.$$

13. A method of selecting remote gateway nodes as in claim 4, wherein said remote network includes M base station nodes and N satellite handover candidate nodes, each base station node has battery energy ($E_i$), a set of $n_{ik}$ sub-contact windows $\{c_{ik}^{I_{ik}}:I_{ik}=1, \ldots, n_{ik}\}$ to each neighboring satellite, and for each link ($l_{ik}$) with a constant power transmission capability of $p_{ik}^{I_{ik}}$, and gateway selection is optimized for communicating with a multiple linked satellites during partial sub-windows ($s_{ik}^{I_{ik}}$) according to $$\text{Maximize}_{\{s_i^{l_i}\}} \sum_{k,l_{ik}} c_{ik}^{l_{ik}} s_k^{l_{ik}};$$

$$\text{Subject to } \sum_k s_k^{l_{ik}} \geq 1 \ \forall \, l_i = 1,2,\ldots,n_i;$$

$$\sum_{k,l_i} c_{ik}^{l_{ik}} p_{ik}^{l_{ik}} s_k^{l_{ik}} \leq E_i;$$

$$\text{With } \quad s_i^{l_{ik}} \in \{1, 0\}; i = 1,2, \ldots, N.$$

14. A method of selecting remote gateway nodes as in claim 4, wherein said remote network includes base station nodes and satellite handover candidate nodes, said base station nodes each have a constant power transmission capability of $p_{ik}^{I_{ik}}$ for transmitting to a linked satellite during linked satellite partial sub-windows ($s_{ik}^{I_{ik}}$) at base station to satellite link speed $r_k$ and with projected traffic volume $M_i$ during recharge, and data capacity availability/requirements are determined from $$M_i - \sum_{k,l_{ik}} r_k p_{ik}^{l_{ik}} s_k^{l_{ik}}.$$

15. A method of selecting gateway nodes in a remote network in an interplanetary communications network, said method comprising the steps of:
   a) identifying nodes in a remote network capable of connecting to a backbone network in an interplanetary communications network, identified said nodes being gateway candidate nodes;
   b) determining an energy aware objective function for each node in said remote network, said objective energy aware function characterizing communications over said interplanetary communications network through each gateway candidate node;
   c) selecting a current gateway from said gateway candidate nodes, said current gateway having an optimum said energy aware objective function result, communications to said backbone network from at least one node in said remote network passing through said current gateway, each said at least one node measures objective function parameters with neighboring nodes;
   d) initiating a handover at a selected time prior to a determined optimum handover time, said optimum said energy aware objective function result occurring at said determined optimum handover time, and after said handover is complete
   e) returning to step (b), energy aware objective functions being updated from measured said objective function parameters and a next said handover gateway being selected.

16. A method of selecting remote gateway nodes as in claim 15, wherein each of said nodes determines said energy aware objective function from orbital parameters for neighboring nodes and a dynamic link budget for said neighboring nodes.

17. A method of selecting remote gateway nodes as in claim 15, wherein said energy aware objective function parameters between each node i and a backbone node k comprise: link life ($T_{ik}(t)$), Euclidean distance ($D_{ik}(t)$), transmit power ($p_{ik}(t)$), waiting time ($\tau_{ik}(t)$), contact window size ($w_{ik}(t)$), wherein $p_{ik}(t) \alpha D^{\gamma}_{ik}(t)$ with $\gamma=2$ for free space propagation and said energy aware objective function ($F_{ik}(t)$) has the form, $$F_{ik}(t) = F_{ik}(D_{ik}(t), T_{ik}(t), \tau_{ik}(t), p_{ik}(t); w_{ik}(t)).$$

18. A method of selecting remote gateway nodes as in claim 17, wherein said energy aware objective function further has the form, $$F_{ik}(t) = \frac{C_1}{D(t)_{ik}^{\gamma}} + C_2 T_{ik}(t) + \frac{C_3}{\tau_{ik}(t)+1} + C_4 w_{ik}$$

for selected tuned parameter coefficients, $C_i$ (i=1, 2, 3, 4, 5).

19. A method of selecting remote gateway nodes as in claim 17, wherein said energy aware objective function ($F_{ik}(t)$) between each node i and a backbone node k is optimized with respect to index k and time t, such that during interval $[t_{i0}, t_{ik}]$, $$F_{ij}(t) = \text{Max}_k F_{ik}(t); \forall t \in [t_{i0}, t_{ij}].$$

20. A method of selecting remote gateway nodes as in claim 17, wherein said energy aware objective function ($F_{ik}(t)$) between each node i and a backbone node k is optimized with respect to index k and time t, such that during interval $[t_{i0}, t_{ik}]$, $$F_{ik}(t) \leq F_{ij}(t) \forall k, \text{ and } t \in [t_{i0}, t_{ij}].$$

21. A method of selecting remote gateway nodes as in claim 17, wherein handovers from current gateway k to said handover gateway m occur at roots of $$[F_{ik}(t) - F_{im}(t)] \text{ and } F_{ik}(t) \leq F_{im}(t).$$

22. A method of selecting remote gateway nodes as in claim 15, wherein said remote network includes M base station nodes and N satellite handover candidate nodes, each base station node has battery energy ($E_i$), a set of $n_{ik}$ sub-contact windows $\{c_{ik}^{I_{ik}}:I_{ik}=1, \ldots, n_{ik}\}$ to each neighboring satellite, and for each link ($l_{ik}$) with a constant power transmission capability of $p_{ik}^{I_{ik}}$, and gateway selection is optimized for communicating with a single linked satellite during partial sub-windows ($s_{ik}^{I_{ik}}$) according to $$\text{Maximize} \quad _{\{s_k^{l_i}\}} \sum_{k,l_{ik}} c_{ik}^{l_{ik}} s_k^{l_{ik}};$$

$$\text{Subject to} \quad \sum_k s_k^{l_{ik}} = 1 \; \forall l_i = 1,2,\ldots,n_i;$$

$$\sum_{k,l_i} c_{ik}^{l_{ik}} p_{ik}^{l_{ik}} s_k^{l_{ik}} \leq E_i;$$

$$\text{With} \quad s_i^{l_{ik}} \in \{1,0\}; i=1,2,\ldots,N.$$

23. A method of selecting remote gateway nodes as in claim 15, wherein said remote network includes M base station nodes and N satellite handover candidate nodes, each base station node has battery energy ($E_i$), a set of $n_{ik}$ sub-contact windows $\{c_{ik}^{I_{ik}}:I_{ik}=1, \ldots, n_{ik}\}$ to each neighboring satellite, and for each link ($l_{ik}$) with a constant power transmission capability of $p_{ik}^{I_{ik}}$, and gateway selection is optimized for communicating with a multiple linked satellites during partial sub-windows ($s_{ik}^{I_{ik}}$) according to $$\text{Maximize} \quad _{\{s_i^{l_i}\}} \sum_{k,l_{ik}} c_{ik}^{l_{ik}} s_k^{l_{ik}};$$

$$\text{Subject to} \quad \sum_k s_k^{l_{ik}} \geq 1 \; \forall l_i = 1,2,\ldots,n_i;$$

$$\sum_{k,l_i} c_{ik}^{l_{ik}} p_{ik}^{l_{ik}} s_k^{l_{ik}} \leq E_i;$$

$$\text{With} \quad s_i^{l_{ik}} \in \{1,0\}; i=1,2,\ldots,N.$$

24. A method of selecting remote gateway nodes as in claim 15, wherein said remote network includes base station nodes and satellite handover candidate nodes, said base station nodes each have a constant power transmission capability of $p_{ik}^{I_{ik}}$ for transmitting to a linked satellite during linked satellite partial sub-windows ($s_{ik}^{I_{ik}}$) at base station to satellite link speed $r_k$ and with projected traffic volume $M_i$ during recharge, and data capacity availability/requirements are the difference of $$M_i - \sum_{k,l_{ik}} r_k p_{ik}^{l_{ik}} s_k^{l_{ik}}.$$

* * * * *